United States Patent [19]

Fantone et al.

[11] Patent Number: 4,786,155
[45] Date of Patent: Nov. 22, 1988

[54] OPERATING MICROSCOPE PROVIDING AN IMAGE OF AN OBSCURED OBJECT

[76] Inventors: Stephen D. Fantone, 11 Grant Rd., Lynnfield, Mass. 01940; Robert A. Pearlstein, 37 Knowles St., Newton Center, Mass. 02159

[21] Appl. No.: 942,254

[22] Filed: Dec. 16, 1986

[51] Int. Cl.⁴ .............. G02B 21/22; G02B 21/36; G02B 21/06; G02B 27/14
[52] U.S. Cl. .................. 350/516; 350/508; 350/523; 350/174
[58] Field of Search .......... 350/508, 511, 513, 514, 350/515, 516, 523, 174, 507, 1.2; 358/113

[56] References Cited

U.S. PATENT DOCUMENTS

| | | | |
|---|---|---|---|
| 3,124,682 | 3/1964 | Kojima et al. | 250/315.3 |
| 3,533,683 | 10/1970 | Stark et al. | 358/113 |
| 3,624,400 | 11/1971 | Cohen | 250/83.8 HP |
| 3,699,341 | 10/1972 | Quillinan et al. | 250/83.3 |
| 3,743,825 | 7/1973 | Cohen | 240/2 MA |
| 3,748,471 | 7/1973 | Ross | 250/33 |
| 3,820,870 | 6/1974 | Smith | 350/511 |
| 4,200,251 | 4/1980 | Borjesson et al. | 244/3.13 |
| 4,249,797 | 2/1981 | Sendecki | 350/174 |
| 4,266,129 | 5/1981 | Versteeg et al. | 250/330 |
| 4,303,340 | 12/1981 | Hoffman | 356/372 |
| 4,467,190 | 8/1984 | Hadani | 350/538 |
| 4,484,498 | 5/1984 | Muller et al. | 350/516 |
| 4,524,385 | 5/1985 | Billingsley et al. | 358/113 |
| 4,594,507 | 6/1986 | Elliot et al. | 250/331 |
| 4,596,930 | 6/1986 | Steil et al. | 250/332 |
| 4,679,068 | 7/1987 | Lillqvist et al. | 358/113 |

FOREIGN PATENT DOCUMENTS

0194692 10/1985 Japan ................... 358/113

OTHER PUBLICATIONS

Research Devices, Inc. (brochure); Articles: B. G. Cohen: Infrared Microscopy; Tech. Bulletin No. 1; Nondestructive Evaluation of Die Attach Bonds by Infrared Microscopy; Tec. Bull. No. 2; Observing Strain Birefringence in Silicon Devices by Infrared Microscopy, Tech. Bull. No. 4.
Quantex Corporation; brochure—dated Jul. 1986.

Primary Examiner—John K. Corbin
Assistant Examiner—Ronald M. Kachmarik
Attorney, Agent, or Firm—Saidman, Sterne, Kessler & Goldstein

[57] ABSTRACT

An improved microscope features real time generation of combined visible and converted images. The converted image is of an object which is obscured by a layer of material which is opaque to visible light, but which is substantially transparent to non-visible penetrating radiation. In an operating microscope application, the invisible penetrating radiation may be radiation of wavelength greater than 620 nm, to which blood is transparent. The converted visible image made using the reflected penetrating radiation will show tissues underlying a layer of blood, which otherwise would obscure the tissues from being viewed by a surgeon. The converted and visible images are combined to generate a combined image which is more useful than would be the reflected penetrating radiation image alone. Image enhancement techinques may be employed to enhance the converted image.

40 Claims, 3 Drawing Sheets

OPERATING MICROSCOPE PROVIDING AN IMAGE OF AN OBSCURED OBJECT

BACKGROUND OF THE INVENTION

1. Field of the Invention

This invention relates generally to operating microscopes, and more particularly, to operating microscopes used in microsurgery and other delicate operations.

2. Related Art

Operating microscopes, according to which a surgeon is provided an enlarged view of the field of the surgery, are generally known in the art. See, for example, U.S. Pat. No. 4,484,498 to Muller et al., which shows a binocular operating microscope according to which a number of different individuals can simultaneously view the field of surgery.

Optical operating microscope technology has generally been quiescent in recent years. This is in part due to the fact that inevitably during surgery a layer of blood obscures the object to be imaged. That is, the ultimate limitation on the surgeon's vision is the layer of blood overlying the tissues of interest. Blood obscures the tissues to a degree depending on the amount of suction employed, how fast the blood seeps into the operating field, and so forth. Some amount of blood flow into the operating field is inevitable. In the case of particularly delicate surgery, such as microsurgery on the eye, the nervous system, and the like, blood in the operating field significantly obscures the nervous and eye tissues, preventing the surgeon from seeing the condition to be corrected by surgery.

Conventional operating microscopes cannot render transparent the layer of blood which inevitably covers the tissues on which the surgery is to be performed so that the surgeon can be provided an image of the underlying object.

U.S. Pat. No. 3,748,471 to Ross shows a "False Color Radiant Energy Detection Method and Apparatus" in which visible and nonvisible radiation (that is, visible and, for example, infrared radiation) are simultaneously reflected from an object and are optically and electronically detected. The nonvisible reflected radiation is converted into a false-colored visible image which is superimposed over the ordinary visible image, to produce a composite false-colored image highlighting portions of the object having a high degree of reflectivity in the nonvisible spectrum. Ross teaches that this apparatus may be of use in determining the relative health of plant life. For example, healthy foliage reflects infrared radiation more completely than does unhealthy foliage. Ross does not teach any apparatus or method whereby an obscuring layer of material can be effectively removed from an image to reveal the underlying object.

U.S. Pat. No. 4,596,930 to Steil et al. shows a charge-coupled imaging device in which different groups of detectors which are sensitive to light energy at different wavelengths are arranged in a single array. However, Steil et al. does not teach any means in which a layer of an obscuring material, such as blood, can be effectively removed from a visible image, such as that of an operating field.

SUMMARY OF THE INVENTION

The present invention is of an operating microscope in which a real time composite image is provided of the visible operating field and of an underlying object which is normally obscured by a layer of material opaque to visible radiation.

More particularly, the microscope of the preesnt invention comprises means for illuminating an object obscured by a layer of a material which is opaque to visible light with radiation consisting of visible light and "penetrating radiation" of a wavelength which penetrates the obscuring material. Where the obscuring material opaque to visible radiation is blood, penetrating radiation of a wavelength greater than about 620 nanometers is employed. Blood is significantly more transparent to radiation of a wavelength greater than 620 nm than to visible radiation. A detection and imaging system detects the penetrating radiation reflected from the object beneath the layer of blood, and converts the reflected penetrating radiation to provide a "converted" visible image. The converted image is thus a visible image of the object underlying the obscuring blood. The converted image provided by the detection and imaging system is then combined with a visible image of the operating field as ordinarily seen. The combined images permit the surgeon to orient himself accurately, by reference to the visible image, while simultaneously viewing the converted image of the object underneath the obscuring layer of blood.

In the preferred embodiment, the composite image generation apparatus of the present invention is configured as a convenient after-market addition to a highly popular preexisting type of stereoscopic operating microscope. This allows such microscopes to be provided with the composite image generation capability according to the invention without a performance penalty in any other area. In a preferred embodiment, the preexisting microscope to which composite image generation capability is added according to the present invention provides collimated optical ray paths at the point at which the composite image generation apparatus of the present invention is inserted; this fact allows the apparatus of the present invention to be inserted in the pre-existing microscope while altering the optical path of the microscope as little as possible.

BRIEF DESCRIPTION OF THE DRAWINGS

The invention will be better understood if reference is made to the accompanying drawings, in which.

DESCRIPTION OF THE PREFERRED EMBODIMENTS

Figure 1:
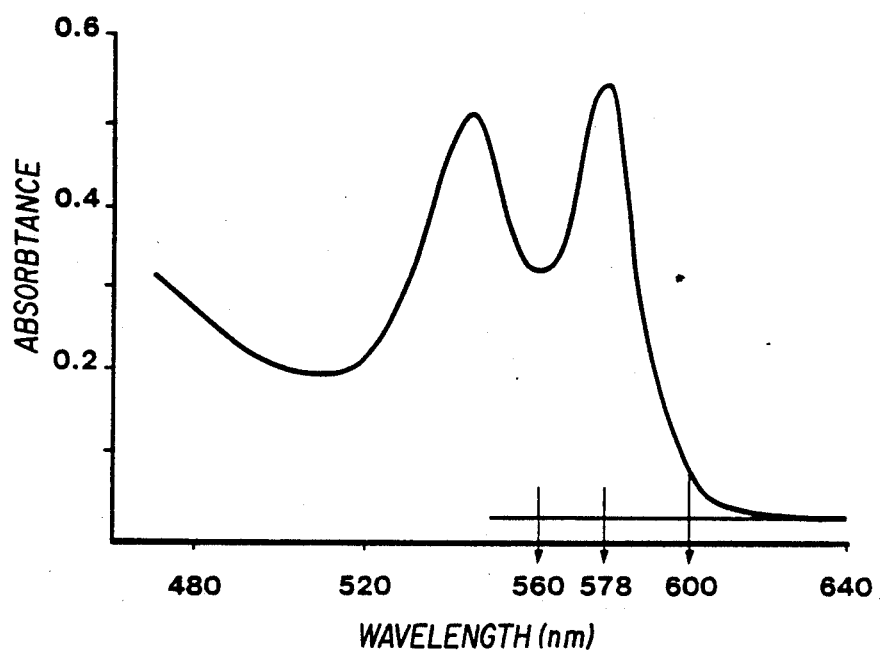
FIG. 1 shows a graph of absorptance of hemoglobin versus wavelength of the illuminating radiation in nanometers.

As described above, in delicate surgery, particularly microsurgery on the eyes, brain, spinal column, and the like, it is not possible to remove all blood from the operating field. In addition to obscuration of the tissues by blood flowing from damaged vessels, blood in small vessels or capillaries may render the tissues red or pink, masking normally visible cues in the target tissues. This is particularly true of tissues of the nervous system or well-vascularized tumors. In either case, the surgeon is frequently reduced to operating by touch and feel.

Clearly, this is not optimal, particularly in view of the fact that the surgeon's expertise will take considerable time to develop under these circumstances.

The present invention of an operating microscope in which the obscuring layer of blood is rendered transparent in real time overcomes this problem.

More particularly, as is generally known, the human eye is sensitive to radiation of wavelengths in the range of about 380–650 nanometers (nm) wavelength. At either end of this range, the eye's sensitivity drops off relatively quickly. For example, "red" is generally considered to extend from 600–650 nm. However, the human eye is decreasingly sensitive to images formed by radiation above about 620 nm. Therefore, if an object is illuminated with radiation of wavelengths greater than 620 nm, the typical eye is decreasingly capable of detecting its image, even though radiation from 620–650 nm is sometimes termed part of the visible spectrum.

According to the present invention, an operating microscope is provided which presents a "combined" image to the surgeon's eyepiece. The combined image is a combination of a "visible" image (that is, an image formed by reflected visible radiation in the 380–620 nm range), and a "converted" image. The converted image is formed on a display device, and is a visible image formed responsive to reflection of "penetrating radiation" in the non-visible range (that is, less then about 380 nm or more than about 620 nm wavelength).

The combined image is of particular use because the converted image may be formed using reflected radiation of a wavelength to which a substance opaque to visible light is transparent. For example, hemoglobin, the main component of blood, is largely opaque to visible light. However, hemoglobin is relatively transparent to radiation of wavelength greater than about 620 nm. If an object obscured by a layer of blood is irradiated by penetrating radiation of wavelength greater than 620 nm, a "penetrating radiation image" of the object can be formed responsive to the reflected penetrating radiation; the penetrating radiation image can then be converted to a corresponding visible "converted" image of the obscured object.

When the visible and converted images are combined in real time by the operating microscope of the present invention, the surgeon can use "clues" in the visible image of the operating field to orient himself, and can simultaneously use the superimposed converted image of the underlying object, for example, to see the actual condition to be remedied by the surgery. In this way, the surgeon will be provided with the correct understanding of the position of his surgical instruments with respect to the tissues upon which he is operating. By comparison, to have the converted image displayed, for example, on a separate video screen while viewing the visible image through the operating microscope would not provide the needed physical correlation between the converted and the visible images. Such an approach would not be as useful to the surgeon.

Radiation outside the ordinary visible spectrum may be used according to the invention to image objects underlying materials opaque in the visible spectrum, and to provide converted images which may be combined with the visible images to provide correlation therebetween. It will be appreciated that the optics of the imaging system of the present invention may provide an effective limitation on the wavelengths of the "penetrating" radiation, that is, on the radiation used to form the converted image. For example, the effective wavelength limits of the very popular Zeiss OPMI microscope are estimated to be about 360–2500 nm. Use of shorter wavelength ultraviolet radiation, perhaps down to 150–200 nm wavelength, might require use of quartz or magnesium flouride optical elements. The sensors used to form the converted image will similarly have to be chosen in accordance with the wavelength of the penetrating radiation.

FIG. 1 shows, as mentioned, a plot of the relative absorptance of radiation by oxyhemoglobin (that is, the primary element of blood bearing oxygen) versus wavelength of the illuminating radiation in nanometers (nm). As can be seen, oxyhemoglobin shows several absorptance peaks in the blue (about 480 nm), green (about 545 nm) and yellow (about 578 nm) ranges, while its absorptance is relatively low in the red range (600–650 nm). This low absorbtance, of course, is why arterial blood appears red. Deoxygenated hemoglobin has the same red and infrared absorptance, but shows only a single peak at about 550–560 nm, so that venous blood appears relatively blue. The relative absorptance of both types of hemoglobin drops rapidly to a value somewhat less than 0.05 at wavelengths greater than about 620 nm. However, as discussed above, at wavelengths greater than about 620 nm, the human eye responds very weakly if at all, such that it cannot effectively image this longer wavelength radiation.

FIG. 1 thus shows that hemoglobin, and hence blood, is effectively more transparent to longer wavelength red light, which cannot be imaged by the eye, and to infrared radiation, than to visible radiation. Therefore, it is possible to irradiate an object obscured by a layer of blood with "penetrating" radiation of wavelength greater than about 620 nm, and to form a "penetrating radiation" image of the reflected penetrating radiation. The penetrating radiation image can then be used to derive a corresponding "converted" image of the actual shape of the object underneath the layer of blood. The present invention exploits this fact.

Figure 2:
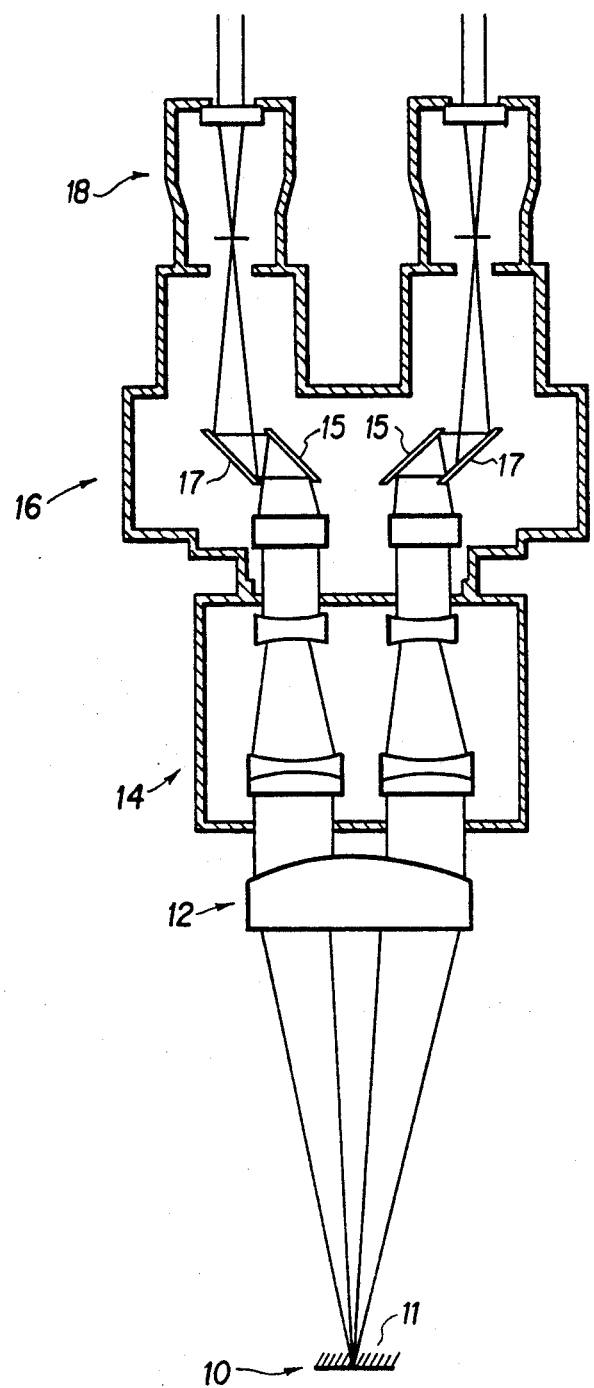
FIG. 2 shows a schematic diagram of the optical principles of a conventional binocular operating microscope.

FIG. 2 shows a schematic diagram demonstrating the optical path of a typical operating microscope, in this case, the Zeiss "OPMI" binocular stereoscopic operating microscope. An object 10 in the operating field is covered by superficial blood vessels or capillaries or by an obscuring layer 11 of material opaque to visible radiation, such as blood. The operating field is imaged by a main objective 12 and a magnification changing unit 14. The image is then passed through a binocular tube 16, and then via prisms 15 and 17 to parallel eye pieces 18. Such conventional microscopes are in common use in operating theaters.

It can be observed from FIG. 2 that the light rays describing the optical path taken by the image of the obsurced object 10 are collimated between the magnification changer 14 and the binocular tube 16. While not necessarily critical to the present invention, this collimation makes it very convenient to provide the penetrating radiation imaging system of the present invention between the magnification changer 14 and binocular tube 16, and thereby to retrofit preexisting Zeiss OPMI microscopes with the penetrating radiation imaging systems of the present invention.

The fact that the Zeiss OPMI microscopes are manufactured in a modular fashion so as to be readily disassembled for modification permits the present invention to be conveniently provided in the form of a retrofit to such conventional microscopes. In addition, the inventors have found that the Zeiss OPMI microscopes focus useful penetrating radiation as well as visible radiation, so that no modifications are needed to effectively gather penetrating radiation reflected from the object and to provide it to the penetrating radiation imaging system 20 of the present invention.

Figure 3:
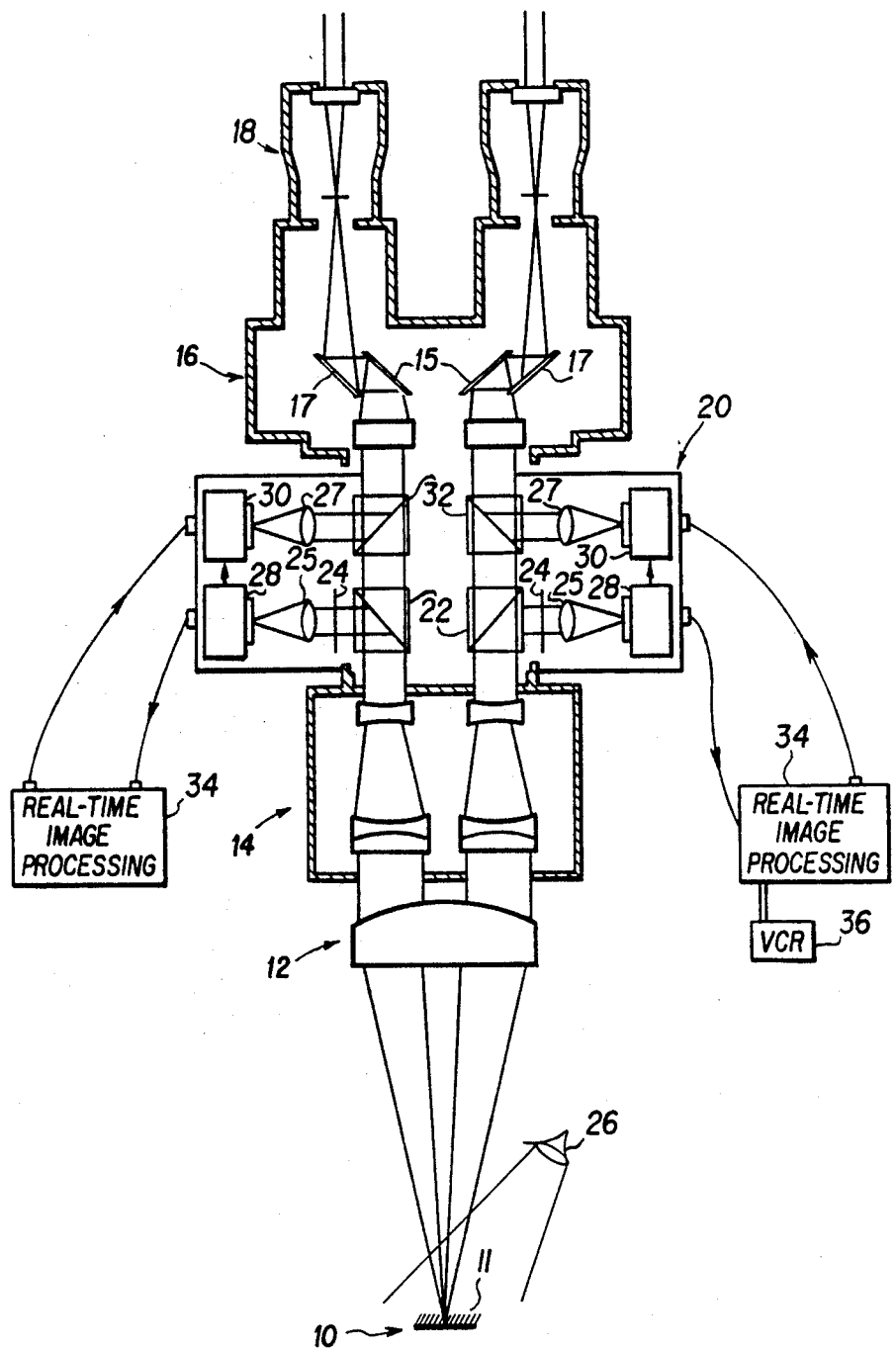
FIG. 3 shows a schematic diagram of the optical principles of the operating microscope of FIG. 2 having had the improved image formation apparatus according to the present invention added thereto.

FIG. 3 is a schematic view of an embodiment of the apparatus of the present invention as retrofit to the Zeiss OPMI microscope of FIG. 2.

Referring now to FIG. 3, the penetrating radiation imaging subsystem 20 of the present invention is interposed between the magnification changer 14 and the binocular tube 16. If needed, a source of the penetrating radiation 26 is provided. Penetrating radiation of a wavelength or of a range of wavelengths to which the obscuring layer 11 is transparent is reflected from the object 10 and collected by the main objective lens 12 exactly as is the visible light. Where the layer 11 to be penetrated is of blood, the penetrating radiation may be radiation of wavelength greater than 620 nm. The magnification changer 14 focuses the reflected penetrating radiation (forming the penetrating radiation image) in the same manner in which it focuses the visible light (forming the visible image).

The penetrating radiation imaging system 20 of the present invention is the binocular embodiment shown has mirror image optical paths which are identical for both left-and right-eye optics. These optical paths begin with a pair of beamsplitters 22 which split the combined visible and penetrating radiation reflected images. Each of the beamsplitters 22 provides a part of the combined visible and penetrating radiation image to a filter 24 and the remaining part to a beam combiner 32. Filters 24 then absorb the visible light of the part of the combined images provided to them and pass only the penetrating radiation image. Lenses 25 focus the penetrating radiation images on suitable sensors 28. The sensors 28 may be so-called Newvicon video tubes, charge-coupled device (CCD) or metal oxide semiconductor (MOS) image forming sensors, or other sensors sensitive to the wavelength of the penetrating radiation. Multiple-element sensors, in which each element is sensitive to radiation of a different wavelength, could also be used. Image signals provided by sensors 28 drive display devices 30, which may be conventional cathode ray tube video displays or the equivalent. Display devices 30 produce the visible "converted" images. These converted images are then focused by lenses 27 on beam combiners 32, which combine the converted images, supplied by the displays 30 responsive to the signals provided by the sensors 28, with the visible images provided by beam splitters 22. The combined converted and visible images are then supplied to the surgeon via mirrors 15 and 17 at eyepieces 18.

The Zeiss OPMI microscopes are stereoscopic, that is, provide differing optical paths for the surgeon's right and left eyes. Provision of the dual optical paths is highly advantageous as it provides depth perception. This advantage is retained according to the preferred embodiment of the present invention, as plural optical paths, each including penetrating radiation image formation and conversion elements, are provided as discussed above.

As mentioned, the combination of the converted and visible images provided by the present invention has significant advantages. In particular, the surgeon is still provided with the visual clues with which he is most familiar, which are provided by the visible image, while simultaneously viewing the overlaid substantial additional detail provided by the converted image. In effect, the surgeon sees through the obscuring layer 11 of blood. In this way, the converted image is displayed to best advantage. By comparison, if the converted image were only provided on a video display or the like, separate from the visible image provided by the operating microscope, the surgeon would have substantial difficulty correlating the converted image with the visible image which he is accustomed to seeing. According to the present invention, the correlation is performed automatically and in real time by provision of the combined images.

Additional elements may be incorporated into the microscope of the present invention, including real-time image processing devices indicated generally by reference numeral 34. Conventional digital image processing can be used to enhance features of particular interest found in the penetrating radiation images formed by the sensors 28. Where appropriate, such image processing techniques are deemed to be within the scope of the present invention. Similarly, the provision of a video cassette recorder 36, for example to record the converted or combined images as a surgical operation proceeds, is within the scope of the present invention. An optical camera (not shown) may similarly be employed to record the combined or converted images.

Other modifications and variations on the present invention are similarly within its scope. For example, it would be possible to have separate video images displayed and combined with respect to the penetrating radiation and visible images received from the magnification changer unit 14. In addition, the converted image can be formed by an array of phosphors (not shown). In the case of use of penetrating radiation of wavelength greater than 620 nm, phosphors could be employed which are excited by penetrating radiation of this wavelength and which emit radiation in the visible spectrum. One could then combine an image of the phosphor array, for example, using a beam combiner 32 or the equivalent, with the visible image provided by the optics of the Zeiss microscope. If phosphors or other sensors were used which were not sensitive to visible light, filters 24 could be dispensed with.

Other modifications and variations on the preferred embodiment of the present invention are also within its scope. For example, one could form a digital signal corresponding to the combined visible and penetrating radiation images received from the magnification changer 14. This signal can be digitally filtered to separate the penetrating radiation for subsequent image processing and enhancement as needed. The penetrating radiation might then be converted to visible wavelengths, and combined with the digitized visible portion of the signal to provide the combined visible and converted images. Similarly, the filters 24 might be ordinary optical filters or be holographic; the beamsplitters 12 and beam combiners 32 may also be selected from a wide variety of suitable elements. A filter (not shown) for the penetrating radiation could also be interposed prior to the eyepieces 18, to prevent the user from eye damage caused by the penetrating radiation.

Furthermore, while the converted image is literally a "false-color" image, even if it is essentially a gray-scale image, it is also within the scope of the present invention to provide a true multi-color converted image, in which various colors of the displayed image correspond to differing wavelengths of the reflected penetrating radiation. Multiple-element displays, each element displaying a different portion of the visible spectrum, are also within the scope of the invention.

Similarly, it will be appreciated that the present invention has applicability beyond the specific application shown and beyond the specific materials mentioned. The present invention could be used for inspection of goods during manufacture; for example, a manufacturing process in which the workpiece 10 is obscured by a material 11 which is opaque to visible light, preventing visual inspection of the underlying surfaces, but which is transparent to radiation of other wavelengths, could be monitored by combination of a visible light image of the overall scene with a converted image made using radiation penetrating the obscuring material.

Therefore, while a preferred embodiment of the present invention has been shown and described, this should not be taken as a limitation on the invention but only as exemplary thereof. The invention is to be limited only by the following claims:

We claim:

1. A microscope for providing an image in the visible spectrum of an object obscured from direct view by a layer of material which is substantially opaque to visible light, comprising:
   means for illuminating the object with radiation including visible light and penetrating radiation, wherein the layer of material obscuring the object is substantially transparent to said penetrating radiation;
   means for forming a visible image of the obscured object;
   means for detecting penetrating radiation reflected from the object obscured by the layer of material and for producing a penetrating radiation image;
   means for displaying a converted image of said object corresponding to said penetrating radiation image; and
   means for combining the visible image of the obscured object and the converted image to provide an overlaid image in the visible spectrum of the object.

2. The microscope of claim 1, wherein said layer of material is blood, and
   wherein said penetrating radiation is radiation of wavelength greater than about 620 nanometers.

3. The microscope of claim 1, further comprising image enhancement means, interposed between said means for detecting and said means for displaying, for enhancing the converted image.

4. The microscope of claim 1, wherein said means for forming a visible image are the optical elements of a conventional microscope, and
   wherein said means for detecting, said means for displaying and said means for combining are adapted to be retrofit to said conventional microscope.

5. The microscope of claim 4, wherein said conventional microscope is a binocular microscope, and
   wherein penetrating radiation imaging apparatus comprising two of each of said means for detecting, said means for displaying, and said means for combining is adapted to be retrofit to said binocular microscope.

6. The microscope of claim 4, wherein said conventional microscope is a surgeon's operating microscope, and
   wherein said layer of material is blood.

7. The microscope of claim 6, wherein said penetrating radiation is of wavelength at least about 620 nanometers.

8. The microscope of claim 1, wherein said means for displaying is a video display device.

9. The microscope of claim 8, wherein said means for combining is beam combiner means.

10. The microscope of claim 1, wherein said microscope comprises main optics which are substantially equally transmissive to visible light and to said penetrating radiation, and said microscope further comprising:
    beamsplitter means for splitting a fraction of the visible light and the penetrating radiation reflected from said object, and
    filter means for passing only the split fraction of the reflected penetrating radiation to said means for detecting said penetrating radiation.

11. A method for providing an image of an object obscured by a layer of a material which is substantially opaque to visible light, comprising the steps of:
    illuminating the object with visible light and with penetrating radiation to which the layer of material is substantially transparent;
    forming a visible image of the obscured object using visible light reflected from the obscured object and the layer of material;
    detecting penetrating radiation having been reflected from said object;
    using said detected penetrating radiation to form a converted image of said object; and
    combining said visible and converted images to provide an image comprising the converted image of the object overlaid with the visible image of the obscured object and the layer of material.

12. The method of claim 11, wherein said material is blood and said penetrating radiation is radiation of wavelength at least about 620 nanometers.

13. The method of claim 11, further comprising the step of enhancing the converted image of said object prior to combining said visible and converted images.

14. The method of claim 11, wherein said converted image is produced by video display means.

15. The method of claim 14, wherein said converted image produced by said video display means is combined optically with said image of the obscured object.

16. Apparatus for providing an image of an object obscured by a layer of material, comprising:
    means for illuminating the object with visible light and with penetrating radiation to which the material obscuring the object is substantially transparent;
    optical means for gathering both visible light and penetrating radiation reflected from the object and the layer of material;
    beamsplitter means for splitting the reflected visible light and penetrating radiation gathered by said optical means to produce a first split fraction and a second split fraction;
    filter means for passing only the penetrating radiation portion of said first split fraction;
    detector means for detecting a penetrating radiation image from the penetrating radiation portion of the first split fraction;
    display means, responsive to said detector means, for providing a converted image corresponding to said penetrating radiation image; and
    means for combining in real time said converted image provided by said display means with a visible image of the obscured object formed from said second split fraction split by said beamsplitter means.

17. The apparatus of claim 16, wherein the layer of material is blood, and
said penetrating radiation is radiation of wavelength not less than about 620 nanometers.

18. The apparatus of claim 16, wherein said apparatus is comprised by a binocular microscope.

19. The apparatus of claim 18, wherein said beamsplitter means, said filter means, said detector means, said display means, and said means for combining are provided in duplicate in dual optical paths of said binocular microscope.

20. The apparatus of claim 19, wherein said duplicate elements are adapted to be conveniently and readily attached to a binocular microscope.

21. The apparatus of claim 20, wherein said binocular microscope is an operating microscope.

22. The apparatus of claim 16, further comprising image enhancement means for enhancing the converted image provided by said display means.

23. The apparatus of claim 16, wherein said display means is video display means.

24. A microscope for providing a real time image of an object obscured from direct view by a layer of blood, comprising:
means for illuminating the object with radiation including visible light and penetrating radiation of at least about 620 nanometers wavelength;
means for forming a visible image of the obscured object;
means for detecting the penetrating radiation reflected from the object beneath the layer of blood and for producing a penetrating radiation image;
means, responsive to said means for detecting, for generating a converting image of said object corresponding to said penetrating radiation image; and
means for combining the visible and converted images for simultaneous, real time viewing of the object.

25. The microscope of claim 24, further comprising image enhancement means for enhancing said converted image of this object.

26. The microscope of claim 24, wherein said means for forming a visible image of the object are the optical elements of a conventional microscope, and
wherein said means for detecting, said means for generating a converted image, and said means for combining are adapted to be readily added to said conventional microscope.

27. The microscope of claim 26, wherein said conventional microscope is a binocular microscope, and
two of each of said means for detecting, said means for generating a converted image, and said means for combining are added to said conventional microscope.

28. The microscope of claim 24, wherein said microscope is a surgeon's operating microscope.

29. The microscope of claim 24, wherein said means for generating a converted image is a video display device.

30. The microscope of claim 24, wherein said means for combining said visible and converted images is beam combiner means.

31. The microscope of claim 24, wherein said microscope comprises main optics which are substantially equally transmissive to visible light and to said penetrating radiation,
said microscope further comprising beamsplitter means for splitting a fraction of the visible light and the penetrating radiation, and
filter means for passing only said penetrating radiation of said fraction to said means for detecting the penetrating radiation.

32. A method for imaging an object obscured by a layer of blood, comprising the steps of:
illuminating the object with visible light and with penetrating radiation of wavelength greater than about 620 nanometers;
forming a visible image of the obscured object using visible light reflected from the obscured object;
detecting penetrating radiation having been reflected from said object;
using said detected penetrating radiation to form a converted image of said object; and
combining said visible and converted images to produce a converted image of the object overlaid on the visible image of the object and the layer of blood.

33. The method of claim 32, further comprising the step of enhancing the converted image of said object prior to combining said visible and converted images.

34. The method of claim 33, wherein said converted image is formed by video display means.

35. The method of claim 34, wherein said converted image formed by said video display means is combined optically with said visible image.

36. Apparatus for providing a visible image of an object obscured by a layer of a material substantially opaque to visible light superimposed upon a converted image of the underlying object, comprising:
means for illuminating the object with visible light of wavelength in the range 380–620 nm and with penetrating radiation of wavelength less than 380 nm or more than 620 nm, wherein the material obscuring the object is substantially transparent to said penetrating radiation;
optical means for gathering both reflected visible light and penetrating radiation;
beamsplitter means for splitting the gathered visible light and penetrating radiation into first and second fractions;
filter means for passing substantially only the penetrating radiation portion of the first fraction;
detector means for forming an image responsive to the filtered reflected penetrating radiation;
display means responsive to said detector means for providing a visible converted image corresponding to the detected reflected penetrating radiation; and
means for combining the visible converted image provided by the display means with a visible image formed using the second fraction of the gathered visible light and penetrating radiation.

37. The apparatus of claim 36, wherein said material is blood, and
said penetrating radiation is radiation of wavelength not less than substantially 620 nanometers.

38. The apparatus of claim 36, wherein said apparatus is a binocular microscope.

39. The apparatus of claim 38, wherein said beamsplitter means, said filter means, said detector means, said display means, and said means for combining are provided in duplicate in dual optical paths of said binocular microscope.

40. A method for imaging an operating field having solid tissue obscured by a layer of blood, comprising the steps of:

illuminating the operating field with visible light and with radiation of a wavelength that is both penetrating to said layer of blood and reflectable by said tissue;

forming a visible image of the operating field using visible light reflected therefrom;

detecting radiation having been reflected from said solid tissue;

using said detected penetrating radiation to form a false color image of said solid tissue; and forming a combined image by superimposing said false color and said visible images to produce an unobscured image of the solid tissue, overlaid on the visible image of the operating field.

* * * * *